(12) United States Patent
Knapp et al.

(10) Patent No.: US 8,224,293 B1
(45) Date of Patent: Jul. 17, 2012

(54) ENCODED COLORGRAM FOR MOBILE DEVICE SECURITY

(76) Inventors: Ronald P. Knapp, Los Altos, CA (US); Kerry D. Brown, Portola Valley, CA (US); Peter Landrock, Cambridge (GB)

( * ) Notice: Subject to any disclaimer, the term of this patent is extended or adjusted under 35 U.S.C. 154(b) by 97 days.

(21) Appl. No.: 12/983,186

(22) Filed: Dec. 31, 2010

(51) Int. Cl.
*H04W 12/06* (2009.01)
(52) U.S. Cl. .................. 455/411; 340/5.82; 235/382
(58) Field of Classification Search .............. 455/411; 340/5.82; 345/173; 713/183; 235/382
See application file for complete search history.

(56) References Cited

U.S. PATENT DOCUMENTS

2008/0191009 A1* 8/2008 Gressel et al. ............... 235/382
2010/0328032 A1* 12/2010 Rofougaran ................ 340/5.82
* cited by examiner

*Primary Examiner* — Phuoc Doan
(74) *Attorney, Agent, or Firm* — Main Law Firm; Richard B. Main

(57) ABSTRACT

A security system includes a software application running in a user's smartphone and a separately carried visual key that the user can image at will with the smartphone's camera. An effective visual key would typically comprise digital data encoded in a series of colored cells arranged in a colorgram. Such digital data is treated as a what-you-have security factor, and is concatenated with other security factors so users can authenticate themselves to websites, internet services, and even within the smartphone device itself or its applications. In one aspect, when users authenticate themselves to a server, the server returns a short-term supply of one-time-passwords or account numbers for use in secure access and financial transactions on other systems.

6 Claims, 5 Drawing Sheets

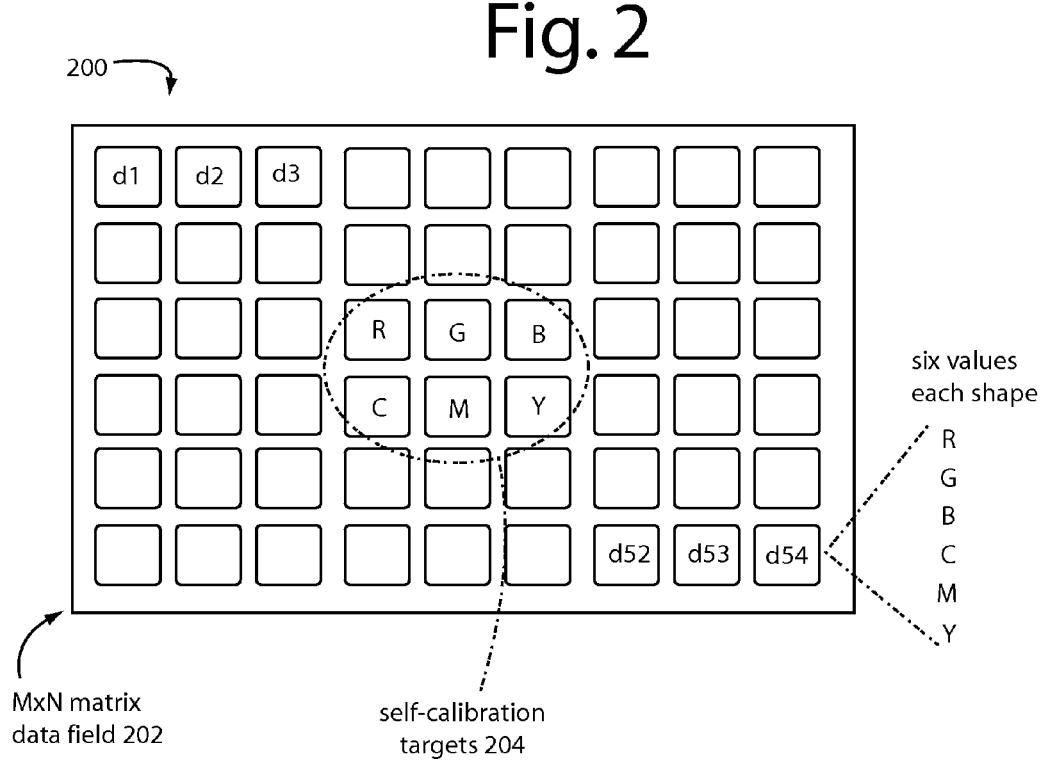
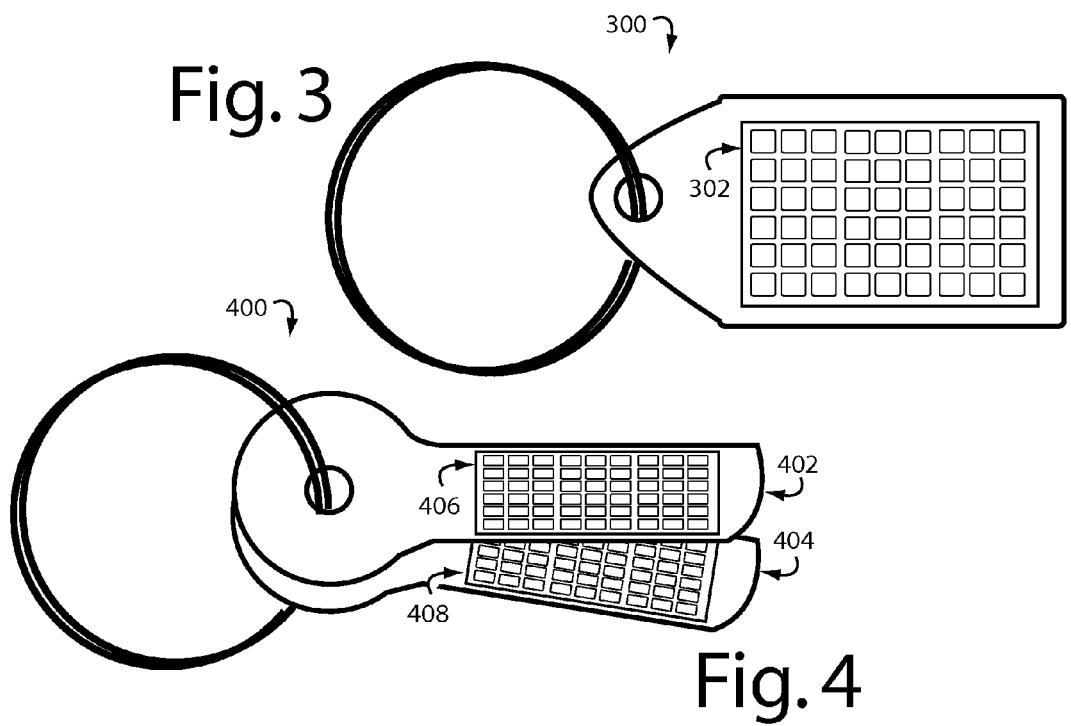

ENCODED COLORGRAM FOR MOBILE DEVICE SECURITY

BACKGROUND OF THE INVENTION

1. Field of the Invention

The present invention relates to mobile computing devices, internet security, authentication, and more particularly to devices and methods for authenticating users online to financial institutions and other websites with the aid of cryptographic keys encoded as two-dimensional (2D) encrypted colorgrams as one of the security factors.

2. Description of Related Art

The average user cannot commit to memory complex enough passwords that would allow derivation of a cryptographic key to use to secure transactions and authentication users, which would typically have a 128-bit minimum entropy requirement. Such users are also overly challenged when required to have a different password for every secure website they visit. Most users simply repeat the use of a few favorite passwords and then don't change them often enough. Such passwords are thus easily compromised via brute force or by carrying over an attack on one website to another.

Authentication factors are pieces of information that can be used to authenticate or verify the identity of an individual. Two-factor authentication employs two different authentication factors to increase the level of security beyond what is possible with only one of the constituents. For example, one kind of authentication factor includes what-you-have, e.g., an electromagnetic stripe credit card, the SIM card typical to many mobile devices and Personal Trusted Devices (PTDs), or other object that is unique and difficult to duplicate. Another type of authentication factor includes what-you-know, such as a user password, a PIN like those used for accessing ATM machines at banks, or other pieces of secret information. A third kind of authentication factor includes who-you-are, for example a personal signature, a voice sample, a fingerprint, an iris scan, or other type of biometric.

Using more than one authentication factor results in what is sometimes called "strong authentication" or "multi-factor authentication." A very common use of strong authentication generally includes just two different factors, the what-you-know and what-you-have authentication factors.

Barcodes and conventional two-dimensional (2D) codes do not have the data storage capacity needed to make an effective what-you-have security factor out of them. They typically have been used for serial numbers and stock keeping unit identifiers. Such traditional devices are so limited that they could not be expected to carry much information. This is usually do to standardized geometries that can't be easily scaled.

When smartphones and other personal mobile electronic devices are used for secure access and to make consumer financial transactions, the loss of the device can be devastating and costly. What is needed are methods and even a personal mobile security appliance that can prevent unauthorized use even when the appliance itself has fallen into the wrong hands.

SUMMARY OF THE INVENTION

Briefly, a security embodiment of the present invention includes a software application running in a user's smartphone or PTD and a separately carried visual key that the user can image at will with the smartphone's camera. An effective visual key would typically comprise digital data encoded in a series of colored cells arranged in a colorgram. Such digital data is treated as a what-you-have security factor, and is concatenated with other security factors so users can authenticate themselves to websites, internet services, and even the smartphone device itself, or its applications. In one aspect, when users authenticate themselves to a server, the server returns a short-term supply of one-time-passwords or account numbers for use in secure access and financial transactions on other systems.

A security gateway is also provided for internet applications and social networking when accessed by consumer mobile devices. An email client, private photos, private documents, and other personal and confidential files can be secured in files in a virtual vault on the user's mobile device using cryptographic keys. Users are provided with representative links to their favorite websites in the virtual vault, and pressing or clicking on an icon will launch an auto-capture sequence, extract a cryptographic key from a provided colorgram, and direct the smartphone's web browser to a bookmarked page.

The respective login data can be auto-filled for the website. A watchdog timer may be included to close the virtual vault when it has been idle more than a predetermined time.

The above and still further objects, features, and advantages of the present invention will become apparent upon consideration of the following detailed description of specific embodiments thereof, especially when taken in conjunction with the accompanying drawings.

BRIEF DESCRIPTION OF THE DRAWINGS

FIG. 2 is a diagram of a colorgram embodiment of the present invention;

FIG. 3 is a diagram of a key fob embodiment of the present invention with a colorgram;

FIG. 4 is a diagram of a key ring embodiment of the present invention with several keys each having its own colorgram;

DETAILED DESCRIPTION OF THE INVENTION

In general, embodiments of the present invention provide security gateways for applications and social networking accessed by consumer mobile devices. An email client, private photos, private documents, and other personal and confidential files can be encrypted in files on a user's mobile device with cryptographic keys in the encoded visual form of colorgrams. Users' "apps" are displayed as icons in an encrypted vault, and selecting one of them will launch an auto-capture sequence, extract the corresponding key from a captured colorgram, use this to recover a password from the vault, and then launch the appropriate website or file viewer.

Alternatively, the "app" may use a key read from the captured colorgram to generate a One-Time Password (OTP) that will enable the user to log on to a bank account for a higher level of security. The embodiments then auto-fill the respective login data for the website. A watchdog timer may be included to close the encrypted folder vault when it has been idle more than a predetermined time.

A principal advantage of embodiments of the present invention is a secure web server can be used to push new, very long and complex passwords to each of the apps in the encrypted folder vault on a regular basis. The users never have to deal with the highly secure passwords directly. The new passwords can be generated with AES cryptography on a Hardware Secure Module (HSM) server, and have superior cryptographic strength to anything users would choose or be able to remember for themselves. All the passwords can be updated regularly, and the user can print them out if needed. The security of each site is thus strengthened, and users are authenticated to their own encrypted folder vaults in their personal trusted device. Multiple encrypted folder vaults, each accessed with a separate colorgram, can provide for sharing of a single mobile device by multiple users.

In one class of embodiments, credit card and payment card accounts are distilled into "softcards" that are kept in the encrypted folder vault. Unique numbers can be easily generated for each instance of card use. Each new number is generated by a secure server and multiple softcard instances can simultaneously be pushed to the user's mobile device. In one embodiment, the distilled softcard keys are optically transferred to a reprogrammable payment card via the mobile device screen, e.g., by flashing color patterns on the display screen to an optical receiver on the reprogrammable payment card.

Figure 1:
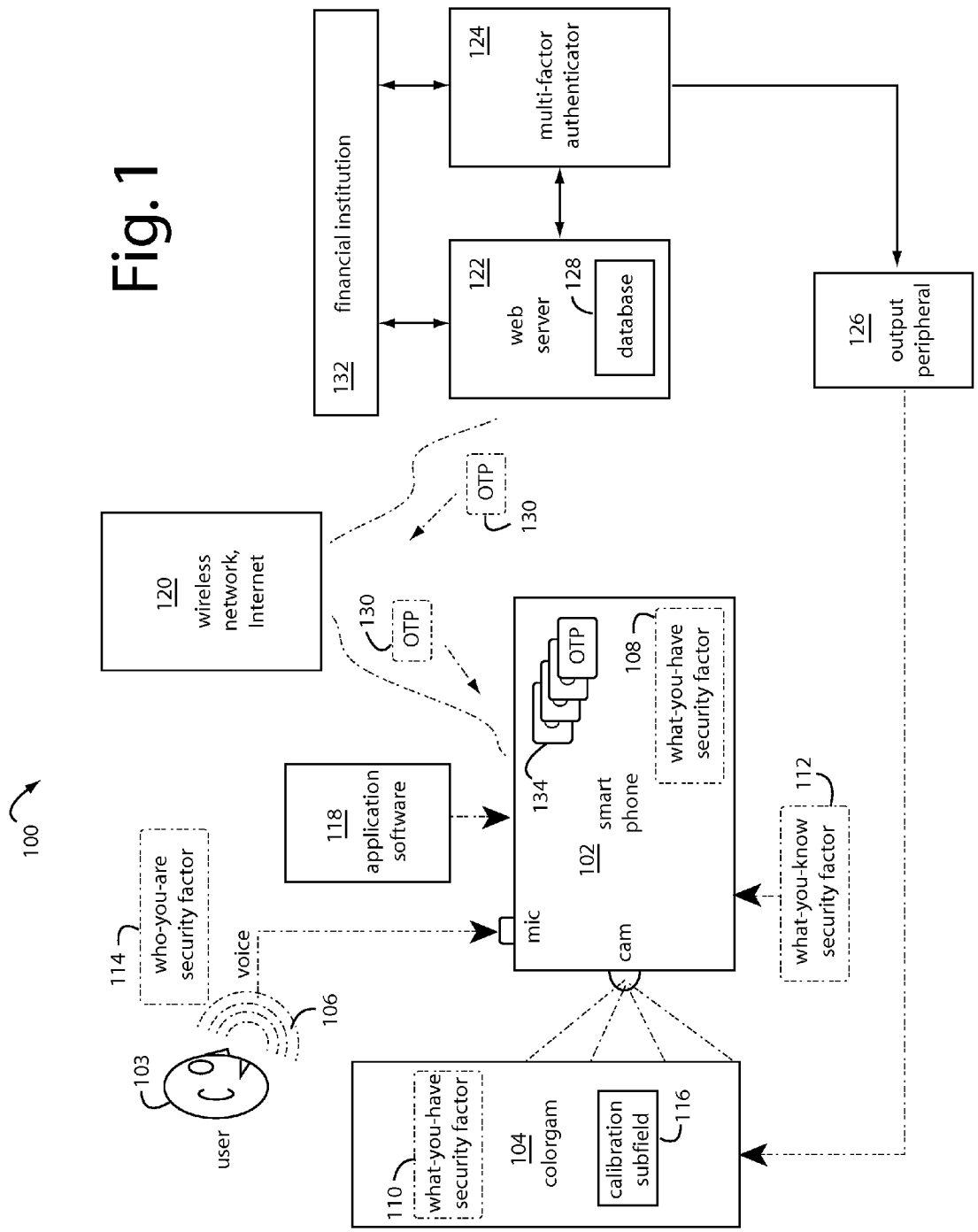
FIG. 1 is a functional block diagram of a highly specialized application of an encrypted colorgram system embodiment of the present invention.

FIG. 1 represents a highly specialized application of an encoded colorgram system, herein referred to by the general reference numeral 100. Such example is intended to demonstrate a practical and important use of the colorgram technology claimed herein. A personal trusted device (PTD) such as a smartphone 102 is routinely carried by a user 103 along with a visual key or colorgram 104 in the form of a decal on a keychain or other personal item. A camera included in the smartphone 102 is able to image the colorgram 104 at will and a microphone can collect an audio sample of a user's voice 106.

Multi-factor authentication is provided by a what-you-have security factor 108 represented, e.g., by a SIM card in the smartphone 102, another what-you-have security factor 110 represented by the user's possession of colorgram 104, a what-you-know security factor 112 represented by a user's entry of a PIN, and a who-you-are security factor 114 represented by the user's voice 106. Some or all of these security factors can be collected in real-time and concatenated together to form a very long user authentication code.

The colorgram 104 may include various color marks and subfields 116 to assist in the image orienting, self-calibration, and interpretation of the color encoding carried by colorgram 104. Colorgram 104 includes visually encoded data in the form of colored cells from a standard palette of colors and arranged in a grid, radial pattern, matrix, or other pattern. The colored cells can be circles, squares, rectangles, ovals, or any other shape.

In one embodiment, a self-calibration subfield 116 includes a color cell from each of the standard palette of colors. If there are eight colors used in the standard palette, then there will be eight colored cells in the self-calibration subfield 116. These are arranged in a matrix in a standard way such that they can easily be recognized together as a self-calibration subfield 116 by an application software (app) 118 installed on the smartphone 102.

Environmental and product variations in the image capture of colorgram 104 with smartphone 102 can often produce large uncertainties in determining which colors in the standard palette of colors each colored cell in colorgram 104 represents. Application software 118 includes subroutines that register each of the color cells imaged in self-calibration subfield 116 as the possible choices, and each color cell from the colorgram 104 is compared to test which standard color is the closest match. The decisions can be reached quickly and with very few reading errors.

A determination of which color from the standard palette of colors is represented by each color cell in colorgram 104 can be ascertained by mapping all the colors visualized and finding the correlations amongst them.

User 103 and smartphone 102 may authenticate themselves through a wireless network 120 to a webserver 122. A multi-factor authenticator 124 can pre-issue credentials like colorgram 104 in the form of small stickers or decals printed on a printer or other output peripheral 126. When the concatenated user authentication code is returned through webserver 122, that portion representing the what-you-have security factor 110 can be verified by multi-factor authenticator 124. A database 128 maintains a list of accounts and one-time-passwords (OTP) 130 authorized by a financial institution 132, for example. A short-term supply of OTP's 134 is stored within smartphone 102 for use later when the network 120 is inaccessible.

FIG. 2 represents a colorgram embodiment of the present invention, and is referred to herein by the general reference numeral 200. Colorgram 200 includes, in this example, a rectangular 9×6 matrix data field 202 decorated with a predetermined physical pattern of colored cells d1-d54. The variety of colors is limited to a finite set of colors in discrete steps. The whole is arranged and configured so that a digital camera in the PTD can image of all the colored cells d1-d54 at once. The choice of colors of each colored cell d1-d54 and its location within the predetermined physical pattern of matrix data field 202 is capable of encoding data.

A subfield 204 of colored cells is chosen to serve as a calibration subfield, and are disposed in an standardized place in the data field and a standardized choice of colors of each colored cell from the finite set of colors in discrete steps and a standardized location within the subfield. In this example, red-green-blue-cyan-magenta-yellow (R, G, B, C, M, and Y). All the other color cells d1-d54 which encode data must be one of these colors, and a processor using a camera to image matrix data field 202 can rely on this rule to speed recognition of the data encoded in colorgram 200.

The example of FIG. 2 uses six standard colors. If eight colors were the standard, each colored cell d1-d54 could be used to represent a 3-bit binary, 0-7 decimal. More colors and larger matrix sizes can be used to encode more data, but the limits are reached by the camera's abilities to resolve the cells and their colors within a larger matrix, or smaller matrix with smaller individual cells.

The calibration subfield 204 serves as a means to orient and synchronize the encoded data present in matrix data field 202. Such data is visually encoded into the data field as (1) a particular step in one of the color spots in the finite set, and (2) in respective locations within the matrix data field 202. Each place in the matrix data field 202 can carry a different weight, meaning, or act as a data definition. Reading the encoded data can begin with colored cell d1 and end with d54, for example. It is entirely possible, of course, to encode arbitrary data such as Internet Uniform Resource Locators (URLs), user information, file names, and other data.

FIG. 3 shows a practical application of a colorgram. A key fob 300 has a colorgram 302 that has been applied to it. The intention is that a user would routinely have such a key fob 300 on their person or handy within easy reach.

FIG. 4 represents a similar application of a colorgram. A key ring 400 has several "keys" 402 and 404 that respectively have different colorgrams 406 and 408 applied to them. A user would routinely have such a key ring 400 with conventional house and car keys on their person or handy within easy reach. Having separate, different colorgrams 406 and 408 would be advantageous when accessing different kinds of security devices, e.g., home and business.

Figure 5:
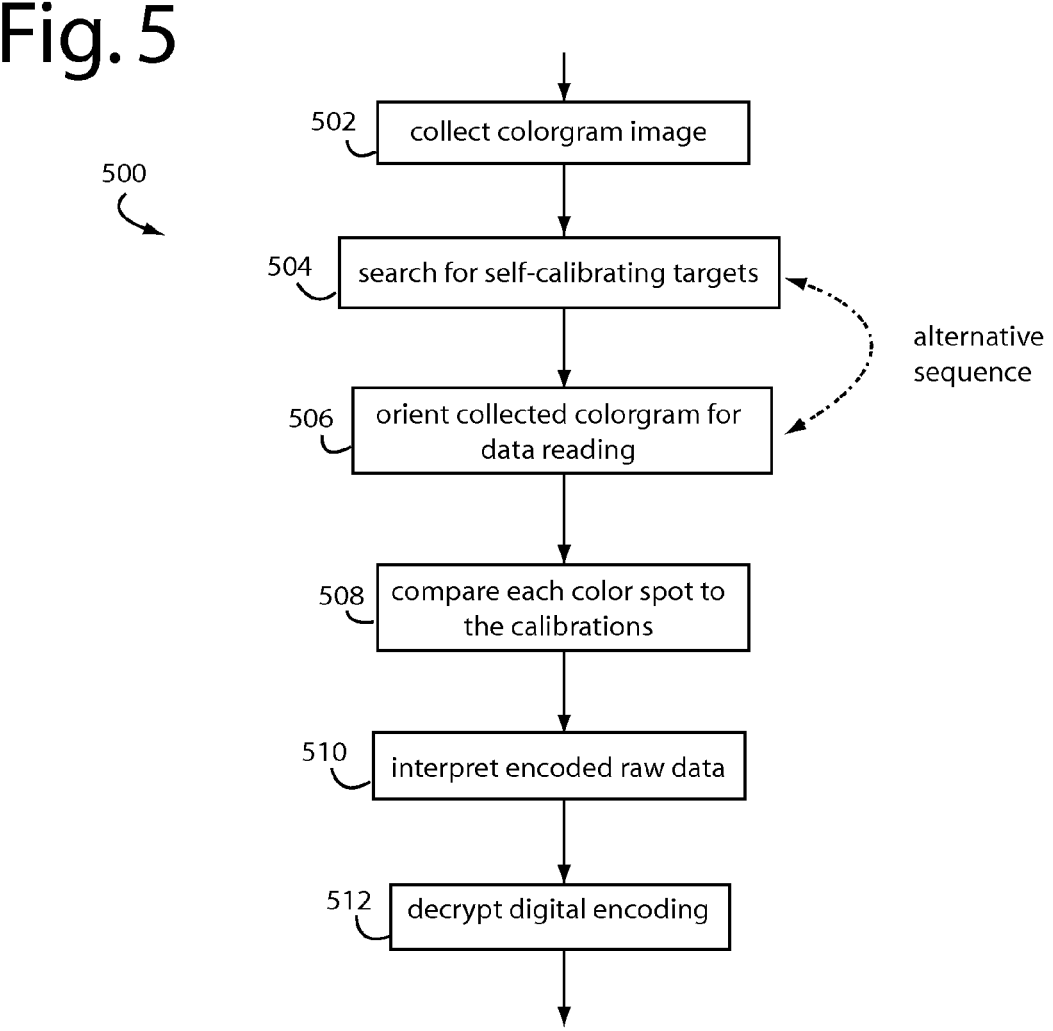
FIG. 5 is a flowchart diagram of a computer subroutine to read and interpret colorgrams and to extract their digital encodings.

FIG. 5 represents a computer subroutine 500 that may be included, e.g., in downloaded application software 118 to read and interpret colorgrams and to extract the encoded data. A step 502 collects a colorgram image through an available camera. The image collected must be freshly captured by the camera data stream and not from a stored image, nor can it be retained after processing.

A step 504 searches the color cells in the colorgram image for a group of self-calibrating color subfields. In some instances, it may be preferable to complete rotational orientation step 506 first.

It may be useful to employ more than one kind of self-calibrating color subfield group. The particular group in use can be used to signal a general class or purpose of the colorgram in which it is embedded, e.g., banking versus social networking. Or the group can signal data field matrix sizes. The data also can signal this.

A step 506 uses the recognition of a rotational alignment cell as a means to orient the rest of the colored cells and data in the colorgram.

A step 508 compares each colored cell imaged by the camera for the colorgram against the discrete colors provided by the self-calibrating color subfield group. The self-calibrating color subfield group is the complete set of all the possible color steps that can exist in the colorgram, so every colored cell in the colorgram must match one of those steps. Any discrepancies in the captured images will be due to lighting, perspective, printing medias, display technologies, white-balance, imager, and other random and uncontrollable variations. Every image pixel can be represented numerically in terms of brightness, color saturation, and color hue. Step 508 matches each colored cell to the one cell in the self-calibrating color subfield group that has the smallest deviation.

A step 510 is then able to recover the raw data that was visually encoded as colors in the colorgram. If the raw data itself was encrypted, a step 512 decrypts this data, e.g., a URL for a website, a password, or as straight data.

Figure 6:
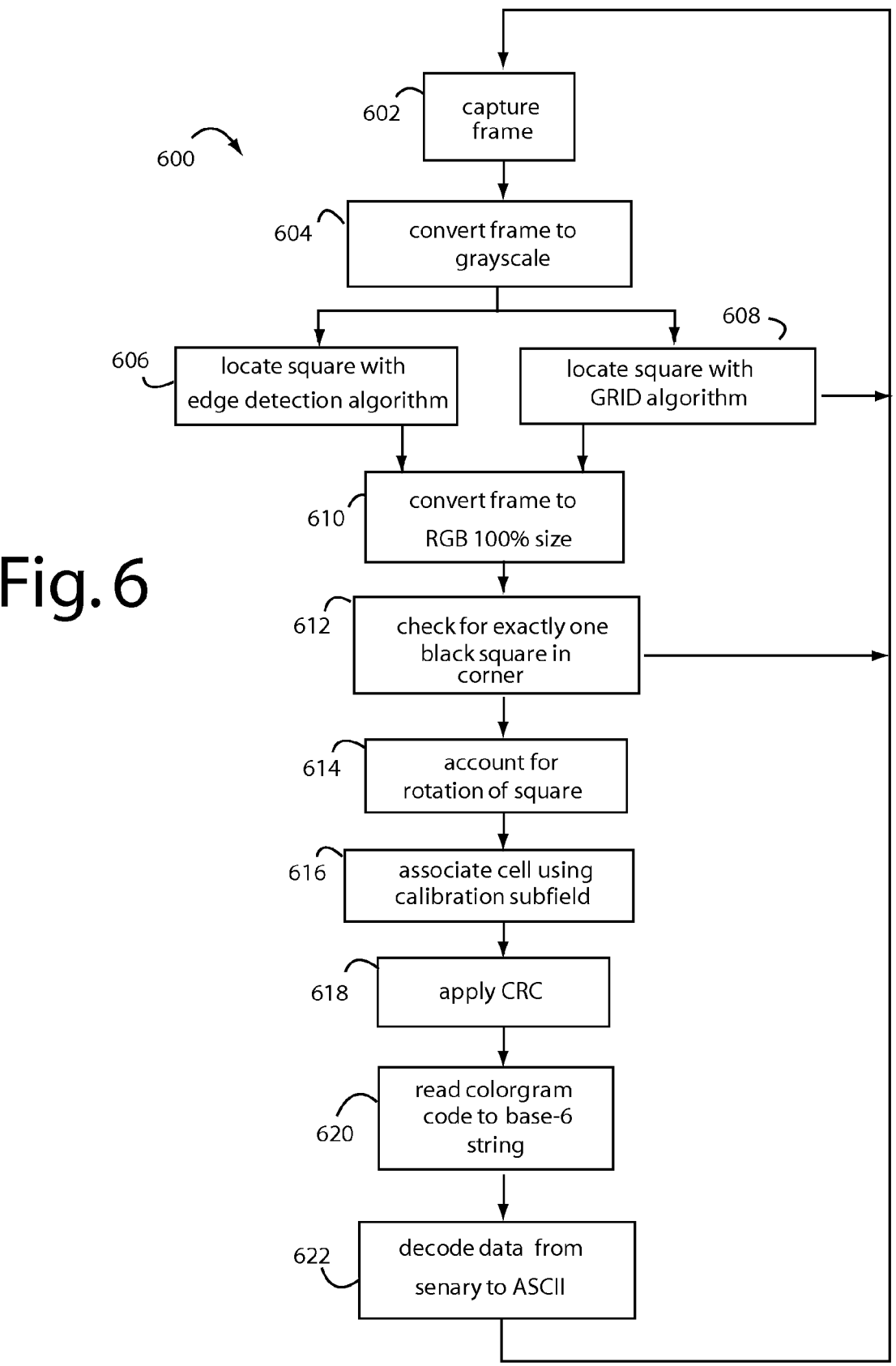
FIG. 6 is a flowchart diagram of a colorgram recognition process embodiment of the present invention.

FIG. 6 represents an Automated Shutter Colorgram Capture (ASCC) colorgram recognition process embodiment of the present invention, and is referred to herein by the general reference numeral 600. A step 602 uses a camera to capture a video frame. A step 604 converts the video frame to grayscale. A step 606 uses an edge detection algorithm to find the location of the colorgram within the video frame. Alternatively, a step 608 uses a color alignment. If neither finds the colorgram, step 602 is used again to capture a better video frame.

A step 610 converts the video frame into a full size color image. A step 612 checks to see if a unique feature like a single black square in only one corner can be identified. Some embodiments may not employ this method.

A step 614 accounts for any apparent rotation of the colorgram using a black corner square as an index. A step 616 calibrates the colors in the colorgram using the calibration subfield cells as a reference. A step 618 applies an cyclic redundancy check (CRC) to determine read accuracy. A step 620 reads the colorgram as a senary (base-6) number string. A step 622 decodes the base-6 senary string into an ASCII text string.

Figure 7:
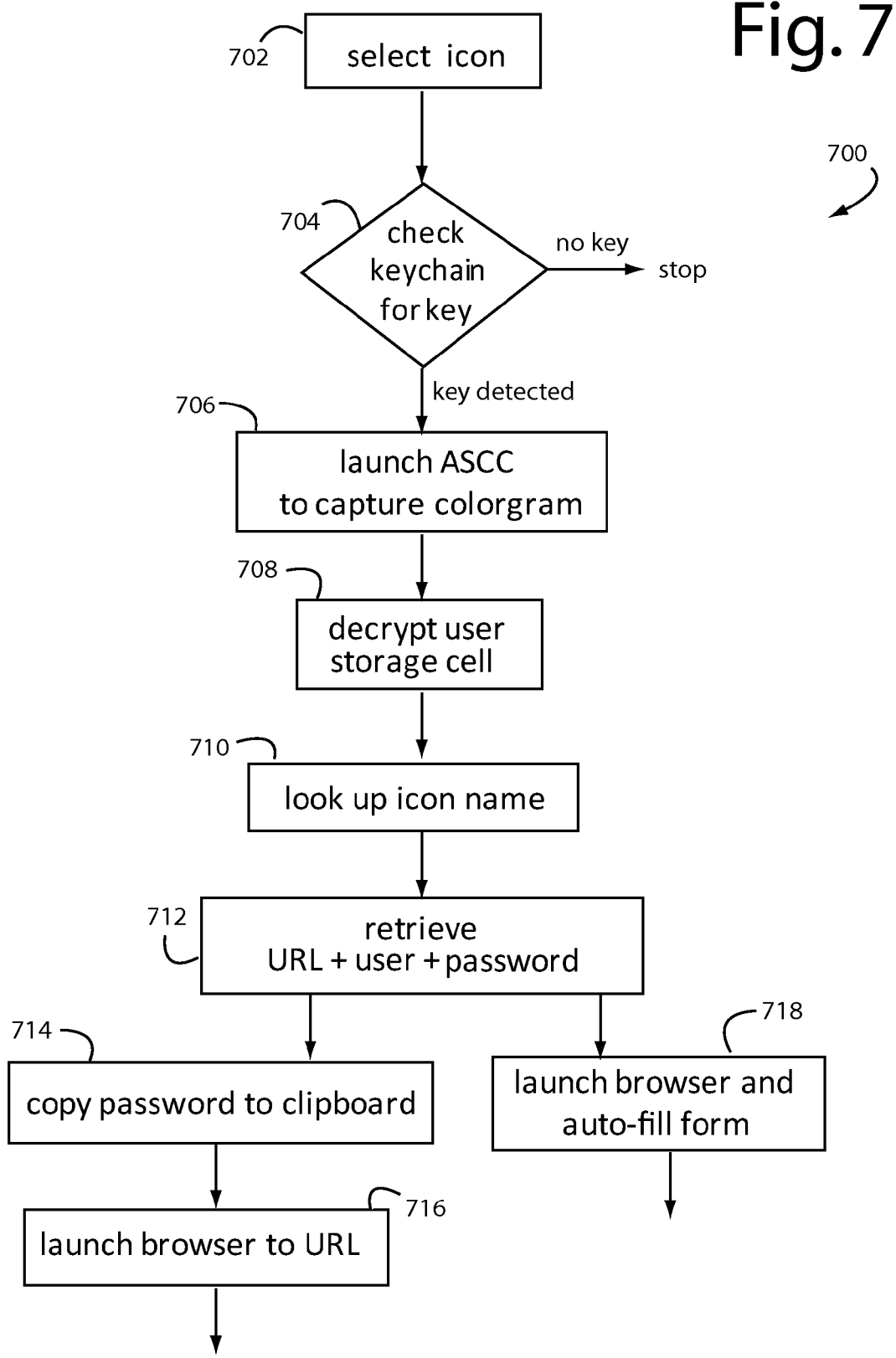
FIG. 7 is a flowchart diagram of a top level program to run on a smartphone with colorgrams to authenticate users to application programs.

A program 700 represented in FIG. 7 runs, for example, at top level in smartphone 102 (FIG. 1). Each secure application on the smartphone is represented on a display screen by a corresponding icon. In step 702, the user selects the application icon that they want to launch. A decision 704 decides if the keychain, like the one in FIG. 3, needs to be captured to collect its colorgram for one of the user authentication security factors. If so, a step 706 launches an ASCC subroutine like that of FIG. 6. A step 708 decrypts the user storage cell. A step 710 looks up the relative icon data encoded in the colorgram. A step 712 fetches the corresponding URL and adds in the user ID and the website password. Such password is a strong random password automatically generated on behalf of the user when enrolling the particular website to use the security gateway. A step 714 copies the relevant PIN to the clipboard and a step 716 launches the browser to the URL. Otherwise, a step 718 launches the browser to the URL and an auto-fill log-in form.

Although particular embodiments of the present invention have been described and illustrated, such is not intended to limit the invention. Modifications and changes will no doubt become apparent to those skilled in the art, and it is intended that the invention only be limited by the scope of the appended claims.

The invention claimed is:

1. An encoded colorgram, comprising:
a data field decorated with a predetermined physical pattern of colored cells, wherein the variety of colors is limited to a finite set of colors in discrete steps, and configured for imaging by a digital camera of all the colored cells at once, and wherein the choice of colors of each colored cell and its location within the predetermined physical pattern is interpreted as the encoding of data;
a subfield of calibrating colored cells disposed in an standardized place in the data field and a standardized choice of colors of each colored cell from the finite set of colors in discrete steps and a standardized location within the subfield; and
data that is visually encoded into the data field as a particular step in one of the color cells in the finite set and in their respective locations within the predetermined physical pattern;
wherein, the subfield of calibrating colored cells provides color decoding information on which discrete color step is represented by each of the colored cells in the data field.

2. The encoded colorgram of claim 1, further comprising:
a color print that includes the data field, the subfield, and the visually encoded data.

3. The encoded colorgram of claim 1, further comprising:
a physical token that can be readily carried by a consumer and which displays a color visual representation of the data field, the subfield, and the visually encoded data.

4. An encoded colorgram system, comprising:
a first separate discrete object on which are displayed:
a data field decorated with a predetermined physical pattern of colored cells, wherein the variety of colors is limited to a finite set of colors in discrete steps, and configured for imaging by a digital camera of all the colored cells at once, and wherein the choice of colors of each colored cell and its location within the predetermined physical pattern is interpreted as the encoding of data;
a subfield of calibrating colored cells disposed in an standardized place in the data field and a standardized choice of colors of each colored cell from the finite set of colors in discrete steps and a standardized location within the subfield; and data that is visually encoded into the data field as a particular step in one of the color cells in the finite set and in their respective locations within the predetermined physical pattern;

wherein, the subfield of calibrating colored cells provides color decoding information on which discrete color step is represented by each of the colored spots in the data field; and a second separate discrete object including a device capable of visually imaging the first separate discrete object and then capable of interpreting the data by first using the subfield of calibrating colored cells to determine which of the finite set of colors in discrete steps is represented by each of the colored cells in the data field.

5. A security system includes a software application running in a user's smartphone and a separately carried visual key that the user can image at will with the smartphone's camera, wherein said visual key comprises digital data encoded in a series of colored cells arranged in a colorgram, and such digital data is treated as a what-you-have security factor and is concatenated with other security factors so users can authenticate themselves to websites, internet services, and smartphones and their applications.

6. The security system of claim 5, further comprising a process for when a user authenticates themselves to a server, the server returns a short-term supply of one-time-passwords or account numbers for use in secure access and financial transactions on other systems.

* * * * *